United States Patent [19]

Skeels et al.

[11] Patent Number: 5,192,522
[45] Date of Patent: Mar. 9, 1993

[54] ZEOLITE LZ-277 AND PROCESS FOR PREPARING SAME

[75] Inventors: Gary W. Skeels, Brewster; Marilyn R. Sears, Ossining, both of N.Y.

[73] Assignee: UOP, Des Plaines, Ill.

[21] Appl. No.: 798,382

[22] Filed: Nov. 26, 1991

[51] Int. Cl.$^5$ .................... C01B 33/28; B01J 29/06
[52] U.S. Cl. .................... 423/713; 423/718; 502/64
[58] Field of Search .................... 502/64; 423/328, 329

[56] References Cited

U.S. PATENT DOCUMENTS

| | | | |
|---|---|---|---|
| 3,436,174 | 4/1969 | Sand | 423/118 |
| 4,124,686 | 11/1978 | Grose et al. | 423/328 |
| 4,657,748 | 4/1987 | Vaughan et al. | 423/329 |
| 4,800,187 | 1/1989 | Lachman et al. | 502/60 |
| 4,840,779 | 6/1989 | Cannan | 502/85 |

OTHER PUBLICATIONS

"Synthesis and Characterization of Zeolite Phi"; Franco et al., Zeolites, 1991, vol. 11, Apr./May, pp. 349–355.

Literature Article in Zeolites, 1986, vol. 6, Sep. pp. 334, 335 and last page, by Marten & Jacobs.

*Primary Examiner*—Anthony McFarlane
*Attorney, Agent, or Firm*—Thomas K. McBride; Richard G. Miller

[57] ABSTRACT

A novel aluminosilicate zeolite, denominated LZ-277 is synthesized hydrothermally from aqueous gels in the $Na_2O$—$Al_2O_3$—$SiO_2$ system and in the absence of an organic templating agent. The as-synthesized LZ-277 has a chemical composition on an anhydrous basis expressed in terms of molar oxide ratios of:

$$1.0 \pm 0.1\ Na_2O:Al_2O_3:3\text{-}15\ SiO_2$$

and has a low adsorptive capacity for $SF_6$ compared with the prior known, and possibly topologically related, zeolite Phi.

8 Claims, No Drawings

ZEOLITE LZ-277 AND PROCESS FOR PREPARING SAME

FIELD OF THE INVENTION

The present invention relates in general to crystalline microporous zeolitic aluminosilicates and more particularly to a novel crystalline zeolite which possibly is topologically related to zeolite Phi. The zeolite is denominated LZ-277 and is prepared by hydrothermal crystallization from an aqueous gel in the $Na_2O - Al_2O_3 - SiO_2$ system without the presence of an organic templating agent.

BACKGROUND OF THE INVENTION

Zeolite Phi is defined and the method for its synthesis described in detail in U.S. Pat. No. 4,124,686, issued Nov. 7, 1978, to R. W. Grose et al. As disclosed therein, zeolite Phi is prepared hydrothermally from aqueous gels in the $[N(CH_3)_4]_2O$—$Na_2O$—$Al_2O_3$—$SiO_2$ system. As synthesized, the zeolite exhibits large pore adsorption characteristics, has a composition expressed in terms of molar oxide ratios as 1.0±0.05 $Na_2O$:0.02–0.05 $R_2O$: $Al_2O_3$:4–7 $SiO_2$: 0–6 $H_2O$ wherein "R" represents the tetramethylammonium ion, and has a characteristic x-ray powder diffraction pattern containing at least the d-spacings shown in Table A below.

TABLE A

| Interplanar Spacing d,A | Relative Intensity |
|---|---|
| 11.6 ± 0.2 | M |
| 9.5 ± 0.2 | S |
| 7.00 ± 0.15 | S |
| 5.61 ± 0.10 | S |
| 5.04 ± 0.08 | S |
| 4.31 ± 0.08 | S |
| 3.43 ± 0.06 | VS |
| 2.92 ± 0.05 | VS |
| 2.61 ± 0.05 | W |
| 2.09 ± 0.05 | W |

In the expression of the relative intensity values, VS=very strong, S=strong, M=medium and W=weak. Evidence supporting the large-pore status of zeolite Phi includes adsorption data for $(C_4F_9)_3N$ and neopentane, the latter being adsorbed on a calcined template-free form of zeolite Phi in an amount of 3.5 weight percent at a temperature of 25° C. and a neopentane pressure of 750 torr. These data can be interpreted to mean that zeolite Phi contains 12-membered oxygen rings, a proposition further supported by data reported by Martens and Jacobs (ZEOLITES, 1986, vol. 6, September) derived from the bifunctional conversion of n-decane using Pt-loaded hydrogen forms of zeolite Phi. It is observed that in the x-ray diffraction pattern of the zeolite a number of the diffraction lines are broadened, suggesting a high degree of disorder in certain crystallographic directions and making a detailed elucidation of the crystal structure impossible.

In addition to the original synthesis of zeolite Phi using tetramethylammonium ions as the structure-directing agent, another synthesis using tetraethylammonium hydroxide (TEAOH) as the organic base and tetraethylorthosilicate as the silica source has been reported. In this regard see M. J. Franco et al, ZEOLITES, 1991, Vol. 11 April/May. In this synthesis the presence of potassium cations in the reaction mixture is said to be essential, but the $K^+$ molar cation fraction must be below 0.1. In marked contrast with the Grose et al synthesis discussed above, the zeolite Phi composition of the synthesis using TEAOH is severely pore blocked due to stacking faults and consequently the void volume is not readily accessible to pyridine and m-xylene.

SUMMARY OF THE INVENTION

There has now been discovered a novel crystalline aluminosilicate zeolite having, as indicated by its x-ray diffraction pattern, a crystal structure similar to that of zeolite Phi, but having the adsorption properties characteristic of the pore-blocked form synthesized using TEAOH and $K^+$ ions as evidenced by an adsorption capacity for $SF_6$ of less than 1 weight percent at 25° C. and 400 torr $SF_6$ pressure. In its as-synthesized form LZ-277 is free of tetraalkylammonium cations in association with framework $AlO_2^-$ tetrahedra, has a chemical composition, in terms of molar oxide ratios, of 1.0±0.1 $Na_2O$:$Al_2O_3$:3–15 $SiO_2$:0–13 $H_2O$ and can be completely converted to other inorganic cation forms without a prior calcination. By the term inorganic cations is meant $H^+$ and $NH_4^+$ as well as metal cations.

In its ion-exchanged and anhydrous form zeolite LZ-277 has a chemical composition in terms of molar oxide ratios of 1.0±0.1 $M_{2/n}O$:$Al_2O_3$:3–15 $SiO_2$ wherein "M" represents a cation having an ionic radius sufficiently small to be exchanged for the sodium cations in the as-synthesized composition.

To prepare LZ-277, a reaction mixture containing reactive sources of sodium, silicon and aluminum is prepared having a composition in terms of oxide-mole ratios within the ranges $Na_2O/SiO_2$=0.1 to 1.0

$SiO_2/Al_2O_3$=4 to 35

$H_2O/Na_2O$=120 to 450

The reaction mixture is maintained under autogenous pressure at a temperature of from about 50° C. to 150° C. until crystals of LZ-277 are formed, and the product crystals are recovered by conventional means.

DETAILED DESCRIPTION OF THE INVENTION

Zeolite LZ-277 can be prepared hydrothermally by crystallization from a reaction mixture whose composition expressed in terms of mole ratios of oxides falls within the following ranges:

|  | Broad | Preferred |
|---|---|---|
| $Na_2O/SiO_2$ = | 0.1–1.0 | 0.15–0.5 |
| $SiO_2/Al_2O_3$ | 4–35 | 5–15 |
| $H_2O/Na_2O$ | 120–450 | 120–200 |

In forming the aqueous reaction mixture from which crystals of LZ-277 are formed, the conventional reactants used in the synthesis of other zeolites from the Na$_2$O - Al$_2$O$_3$ - SiO$_2$ - H$_2$O system are suitably employed. Alumina can be obtained from activated alumina, alpha alumina, gamma alumina, alumina trihydrate, aluminum hydroxide or sodium aluminate. Sodium hydroxide can supply a portion or all of the sodium cations required. Silica sols, sodium silicates or solid reactive amorphous silicas can serve as the source of silica for the reaction mixtures. The solid amorphous silicas include chemically-precipitated silicas, fume silicas, arc silicas and siliceous materials derived from acid extracted zeolite minerals.

Advantageously the crystallization procedure is carried out at a temperature in the range of about 50° C. to 150° C., preferably in the range of 80° C. to 150° C. The pressure conditions are not narrowly critical, and are ordinarily established autogenously within the sealed reactor containing the reaction mixture at the particular digestion and crystallization temperature chosen. Any suitable heating apparatus, e.g., an oven, sand bath, oil bath or jacketed autoclave, can be used. Heating is continued until the crystals of zeolite LZ-277 are formed, usually for a period of 1 or 2 days, but in some instances as long as 50 days or more. The product crystals are then recovered, as by filtration or centrifugation, and washed with water to remove at least the bulk of the mother liquor, usually until the pH value for the wash water is less than about 10.

Although the crystal structure of zeolite LZ-277 has not been fully elucidated, the x-ray diffraction pattern of the zeolite establishes that there is probably a topological relationship with the various zeolite Phi compositions produced using organic templating agents. It also appears that, like the zeolite Phi synthesized by Franco et al, supra, using TEAOH as the templating material, LZ-277 is substantially pore blocked by virtue of having stacking faults in its crystal lattice. Whatever the reason, the effective nominal pore diameters of LZ-277 are in the range of about 4.3 to 5.0 Angstroms. Thus LZ-277 is effectively a small-pore zeolite composition as evidenced by the fact that it will adsorb less than 1 weight percent SF$_6$. While the SF$_6$ molecule is too large to enter the internal pore system of the zeolite, a small fraction of the adsorption capacity of the zeolite is satisfied by adsorption on the outer surface of the crystal without the necessity of being able to enter the pore system. Assuming a crystal surface area of 10 m$^2$/g., for example, the SF$_6$ packing could theoretically account for 0.08 wt. % adsorbed SF$_6$.

The small-pore property of zeolite LZ-277 makes it a very useful catalyst base for the conversion of methanol to olefin products. A number of hydrocarbon conversion processes, e.g., olefin oligomerization and dewaxing, are also facilitated by zeolite pore sizes in the range effective in zeolite LZ-277.

The composition of zeolite LZ-277 can be expressed stoichiometrically in terms of moles of oxides as

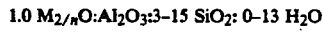

1.0 M$_{2/n}$O:Al$_2$O$_3$:3–15 SiO$_2$: 0–13 H$_2$O

In its as-synthesized form, "M" represents the sodium cation, but the original sodium cations can be ion-exchanged by conventional techniques by one or more other cation species having ionic radii small enough to permit passage through the pore system of the crystals. Thus "M" can represent essentially any metal cation, including alkali metals, alkaline earth metals, and transition metals, particularly those having atomic numbers of from 21 to 28, from 39 to 46 and from 72 to 78, as well as H$^+$ and NH$_4^+$ cations. Organic quaternary ammonium cations, such as tetramethyl- and tetraethylammonium cations, are too large to be introduced into LZ-277 by ion-exchange, and accordingly the zeolite cannot exist in such a cation form. The adsorption properties, empirical chemical composition and the x-ray powder diffraction pattern of zeolite LZ-277 serve, in combination, to distinguish it from other zeolite species.

The x-ray data for the sample of zeolite LZ-277 prepared in accordance with Example 1 set forth hereinafter is shown in Table B, below. Zeolite Y and zeolite P$_c$ have been observed as common impurity species in LZ-277 preparations.

TABLE B

| 2θ | d,A | I/I$_o$ × 100 |
|---|---|---|
| 6.155 | 14.360 | 54.4* |
| 7.461 | 11.848 | 23.9 |
| 9.465 | 9.344 | 43. |
| 10.063 | 8.785 | 27.5* |
| 12.477 | 7.094 | 23.3** |
| 12.824 | 6.902 | 32.3 |
| 15.580 | 5.895 | 19.6* |
| 16.231 | 5.461 | 8.3 |
| 17.566 | 5.049 | 94.2* |
| 20.576 | 4.377 | 62.0 |
| 21.537 | 4.117 | 27.1** |
| 22.336 | 3.980 | 22.2* |
| 23.519 | 3.783 | 13.6* |
| 25.834 | 3.449 | 55.4 |
| 26.900 | 3.314 | 10.9* |
| 28.134 | 3.172 | 23.2** |
| 30.519 | 2.929 | 100.0 |
| 31.227 | 2.864 | 39.0* |
| 32.271 | 2.774 | 7.9* |
| 33.430 | 2.630 | 8.3* |
| 34.411 | 2.606 | 37.7 |
| 39.173 | 2.300 | 10.7 |
| 42.466 | 2.129 | 10.0 |
| 43.232 | 2.093 | 28.4 |
| 47.494 | 1.914 | 8.7 |
| 50.345 | 1.812 | 25.7 |
| 53.139 | 1.724 | 24.1 |
| 53.924 | 1.700 | 8.5 |
| 54.593 | 1.681 | 9.3 |

* = line attributed to zeolite Y
** = line attributed to zeolite P$_c$

Standard techniques were employed to obtain the x-ray diffraction data disclosed herein. The radiation was the K-alpha doublet of copper, and a Geiger-counter spectrometer with a strip-chart pen recorder was used. The peak heights and their positions as a function of 2 times theta (θ), where theta is the Bragg angle, were read from the spectrometer chart. From these, the relative intensities of the peaks were expressed either as the ratio I/I$_o$ or as "VS," very strong; "S," strong; "M," medium; "W," weak; and "d(A), observed," the interplanar spacing in Angstrom units corresponding to the recorded lines, were determined. The particular x-ray technique and/or apparatus employed, the humidity, the temperature, the orientation of the powder crystals and other variables, all of which are well known and understood by those skilled in the art of x-ray crystallography or diffraction, can cause some variation in the intensities and positions of the x-ray lines.

It is not, however, necessary to use all of the lines of the pattern of Table B to characterize zeolite LZ-277 as a unique zeolite species and to distinguish it from all other crystalline zeolites. It is sufficient for such purposes that the characterizing x-ray diffraction pattern of zeolite Phi have at least those d-spacings given in Table C below. The tolerance values assigned in Table C provide for the variations in positions of the lines due to the factors referred to above.

TABLE C

| d,A (Observed) | Relative Intensity |
|---|---|
| 11.77 ± 0.5 | M |
| 9.44 ± 0.2 | M-S |
| 6.84 ± 0.1 | VS |
| 4.93 ± 0.1 | M-S |
| 4.29 ± 0.1 | M-S |
| 3.42 ± 0.1 | S |
| 2.91 ± 0.1 | VS |
| 2.82 ± 0.1 | M |
| 2.59 ± 0.1 | M |

The various ion-exchanged forms of the zeolite exhibit the same essential x-ray diffraction pattern as shown in Table C.

The method for preparing zeolite LZ-277 is illustrated by the following examples:

EXAMPLE 1

(a) A reaction mixture was prepared as follows: Solution (A) was formed by dissolving 12.7 grams of NaOH (77.48 wt. % $Na_2O$, 22.52 wt. % $H_2O$) in 25 grams of deionized water. To the caustic solution was added 15.77 grams of alumina trihydrate (64.66 wt. % $Al_2O_3$), and the resultant mixture heated to boiling with stirring to dissolve the alumina. The product solution was cooled to ambient room temperature. Solution (B) was formed by mixing 80.11 grams of an aqueous silica sol (Ludox LS; 30 wt. % $SiO_2$, 0.10 wt. % $Na_2O$) with 25.86 grams of water. The two solutions were combined by adding solution (A) to solution (B) with stirring. The resulting reaction mixture, having an initial pH of 3.15, was placed in a sealed 250 ml. polytetrafluoroethylene container and heated at 100° C. in a forced air oven for 24 hours. The composition of the reaction mixture was:

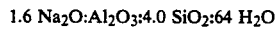

1.6 $Na_2O:Al_2O_3$:4.0 $SiO_2$:64 $H_2O$

At the end of the 24-hour crystallization period, the contents of the reaction mixture container were homogenized by vigorous shaking and the solids recovered by filtration and thorough washing with deionized water.

By x-ray analysis, the recovered solids were found to consist principally of zeolite LZ-277 together with zeolite Y and the cubic form of the zeolite P phase as the predominant crystalline impurity phases. The x-ray powder diffraction pattern observed appears in Table B, above.

(b) Using the same reagents and procedures as in part (a) above but doubling the proportions of all ingredients with respect to the $Al_2O_3$ content, a reaction mixture was prepared having the following composition:

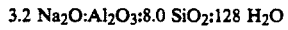

3.2 $Na_2O:Al_2O_3$:8.0 $SiO_2$:128 $H_2O$

This reaction mixture was crystallized for 24 hours in the same manner using the same apparatus as in part (a). Upon recovery of the crystals from a portion of the reaction mixture the product was found to contain no LZ-277 and to be essentially pure zeolite Y. Continued crystallization at 100° C. did not result in the production of any LZ-277.

(c) Using the same reagents and procedures as in part (a) above except that the proportions of the various reagents were changed, a reaction mixture was prepared having the following composition:

1.0 $Na_2O:Al_2O_3$:8 $SiO_2$:512 $H_2O$

This reaction mixture, which had an initial pH of 11.92, was placed in a sealed polytetrafluoroethylene reactor and heated in a forced air oven at 100° C. Periodic inspection and sampling of the reactor contents revealed that even after 68 days the solids were amorphous by x-ray analysis. After 90 days the x-ray pattern consisted of a single peak at a $2\theta$ value of 7.55.

EXAMPLE 2

A successful synthesis of zeolite LZ-277 from a reaction mixture having a molar $SiO_2Al_2O_3$ ratio of 8.0 was accomplished by means of the following procedure: A first composition (A) was formed by adding 7.881 grams of aluminum trihydrate (64.66 weight % $Al_2O_3$) to an aqueous solution of 6.308 grams NaOH in 12.5 grams of water. The resulting mixture was heated to boiling with stirring to form a clear sodium aluminate solution, and then cooled to ambient room temperature. A second composition (B) was formed by mixing 80.11 grams of an aqueous silica sol (30 wt. % $SiO_2$, 0.1 wt. % $Na_2O$) with 157.89 grams of deionized water. Thereafter composition (A) was added to composition (B) with mixing to form a gel. The gel was then transferred to and sealed in a 500 ml. polytetrafluoroethylene reactor. The final product, having a composition

1.6 $Na_2O:Al_2O_3$:8 $SiO_2$:256 $H_2O$ was placed in a forced air oven at 100° C. At intervals of 1, 2, 3, 6, 14, 23, 30 and 47 days samples of the gel were analyzed by x-ray to determine the progress of the digestion-crystallization process. After 30 days the solids in the reactor were still amorphous. After 47 days crystals of zeolite LZ-277 had formed as evidenced by the following x-ray powder diffraction data:

TABLE D

| d,A (Observed) | $I/I_o \times 100$ |
|---|---|
| 11.77 | 30.6 |
| 9.44 | 54.2 |
| 6.84 | 100.0 |
| 5.48 | 19.7 |
| 4.93 | 39.3 |
| 4.29 | 37.1 |
| 3.42 | 71.4 |
| 2.91 | 96.9 |
| 2.82 | 24.6 |
| 2.59 | 32.1 |
| 2.28 | 3.5 |
| 2.11 | 6.3 |
| 2.08 | 21.6 |
| 1.90 | 11.6 |
| 1.80 | 20.1 |
| 1.71 | 22.6 |
| 1.68 | 7.6 |
| 1.66 | 8.2 |

After 54 days of crystallization, the solids product was still principally zeolite LZ-277, but the x-ray diffraction pattern contained four additional peaks of medium to strong intensity which are part of the characteristic x-ray pattern of zeolite $P_c$, namely

| $2\theta$ | d,A | $I/I_o \times 100$ |
|---|---|---|
| 12.55 | 7.05 | 37.2 |
| 21.75 | 4.09 | 34.4 |
| 28.23 | 3.16 | 43.5 |

-continued

| 2θ | d,A | $I/I_o \times 100$ |
|---|---|---|
| 33.54 | 2.67 | 16.0 |

The LZ-277 product was found by chemical analysis to have the following composition:

$$0.97\ Na_2O:Al_2O_3:6.64\ SiO_2:8.0\ H_2O$$

After activation at 450° C. under vacuum, the LZ-277 composition was found to adsorb 18.6 wt. % oxygen at −183° C. and 100 torr oxygen pressure; <1.0 wt. % $SF_6$ at 25° C. and 400 torr $SF_6$ pressure; and 23.8 wt. % $H_2O$ at 25° C. and 4.6 torr $H_2O$ pressure. The particles had a nominally spherical morphology with the spheres formed by intersecting disks. Particle diameters were in the range of 1 to 4 micrometers.

EXAMPLE 3

A portion of the LZ-277 product of Example 2 was converted to the ammonium cation form by dissolving 20 grams of $NH_4Cl$ in 100 ml. of distilled water and thereafter adding, with stirring, 4 grams of the LZ-277. The resulting slurry was heated for 1 hour at 95° C. and then the solids were recovered by filtration and washed with water. The procedure was repeated two more times with the final solids product being washed until chloride-free as tested with $AgNO_3$ solution, and then dried in air at ambient room temperature. The ion-exchanged product had a chemical composition, anhydrous basis, of:

$$0.92\ (NH_4)_2O:Al_2O_3:6.52\ SiO_2$$

The following x-ray powder diffraction data was obtained for the ammonium-exchanged LZ-277 composition:

TABLE E

| d,A (Observed) | $I/I_o \times 100$ |
|---|---|
| 11.79 | 14.8 |
| 9.26 | 42.9 |
| 6.87 | 100.0 |
| 5.49 | 12.5 |
| 4.97 | 61.9 |
| 4.30 | 54.2 |
| 3.43 | 51.7 |
| 2.92 | 50.5 |
| 2.82 | 19.7 |
| 2.60 | 13.6 |
| 2.29 | 6.0 |
| 2.11 | 4.7 |
| 2.08 | 10.8 |
| 1.90 | 3.9 |
| 1.80 | 14.5 |
| 1.72 | 11.5 |
| 1.63 | 4.8 |

What is claimed is:

1. A synthetic microporous crystalline zeolite having an as-synthesized chemical composition on an anhydrous basis and expressed in terms of molar oxide ratios of $$1.0\pm0.1\ Na_2O:Al_2O_3:3-15\ SiO_2$$

said zeolite having an x-ray powder diffraction pattern having at least the following d-spacings

| d,A | Relative Intensity |
|---|---|
| 11.77 ± 0.5 | M |
| 9.44 ± 0.2 | M-S |
| 6.84 ± 0.1 | VS |
| 4.93 ± 0.1 | M-S |
| 4.29 ± 0.1 | M-S |
| 3.42 ± 0.1 | S |
| 2.91 ± 0.1 | VS |
| 2.82 ± 0.1 | M |
| 2.59 ± 0.1 | M | said as-synthesized zeolite having an adsorption capacity for $SF_6$ at 25° C. and 400 torr $SF_6$ pressure of less than 1 weight percent, the sodium cations of said zeolite being completely replaceable by ion-exchange without prior calcination or oxidative reaction involving said zeolite, with at least one cation species selected from the group consisting of $H^+$, $NH_4^+$, other alkali metals, alkaline earth metals and transition metals.

2. Synthetic microporous crystalline zeolite according to claim 1 wherein at least some of the sodium cations have been ion-exchanged by at least one cation species selected from the group consisting of $H^+$, $NH_4^+$, other alkali metals, alkaline earth metals and transition metals.

3. Synthetic microporous crystalline zeolite according to claim 2 wherein the sodium cations are ion-exchanged by at least one transition metal.

4. Synthetic microporous crystalline zeolite according to claim 3 wherein the transition metal has an atomic number in the range of 21 to 28.

5. Synthetic microporous crystalline zeolite according to claim 3 wherein the transition metal has an atomic number in the range of 39 to 46.

6. Synthetic microporous crystalline zeolite according to claim 3 wherein the transition metal has an atomic number in the rang of 72 to 78.

7. Process for preparing a synthetic microporous crystalline zeolite of claim 1 which comprises forming a reaction mixture free of organic templating agents and having a composition expressed in terms of molar ratios of oxides in the range of $$Na_2O/SiO_2 = 0.1\ to\ 1.0$$

$$SiO_2/Al_2O_3 = 4\ to\ 35$$

$$H_2O/Na_2O = 120\ to\ 450$$

and heating said reaction mixture under autogenous pressure at a temperature in the range of 50° to 150° C. until crystals of the zeolite are formed.

8. Process according to claim 7 wherein the reaction mixture has a composition in terms of molar ratios of oxides in the range of $$Na_2O/SiO_2 = 0.15\ to\ 0.5$$

$$SiO_2/Al_2O_3 = 5\ to\ 15$$

$$H_2O/Na_2O = 120\ to\ 200$$

and the crystallization temperature is from 80° C. to 150° C.

* * * * *